(12) United States Patent
Jeong et al.

(10) Patent No.: US 10,551,839 B2
(45) Date of Patent: Feb. 4, 2020

(54) MOBILE ELECTRONIC DEVICE AND NAVIGATION METHOD THEREOF

(71) Applicant: Samsung Electronics Co., Ltd., Suwon-si, Gyeonggi-do (KR)

(72) Inventors: Jinhong Jeong, Yongin-si (KR); Jamin Goo, Suwon-si (KR); Hyungwoo Kim, Hwaseong-si (KR); Jihyun Park, Seongnam-si (KR); Seungwoo Shin, Yongin-si (KR); Seunghyuk Yu, Seoul (KR); Dongkyu Lee, Yongin-si (KR); Kyunghee Lee, Seoul (KR); Juyeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 15/815,191

(22) Filed: Nov. 16, 2017

(65) Prior Publication Data
US 2018/0136661 A1    May 17, 2018

(30) Foreign Application Priority Data
Nov. 16, 2016    (KR) .................. 10-2016-0152579

(51) Int. Cl.
*G05D 1/02* (2006.01)
*G01C 21/34* (2006.01)
*G01C 21/36* (2006.01)
*G05D 1/00* (2006.01)

(52) U.S. Cl.
CPC ....... *G05D 1/0212* (2013.01); *G01C 21/3461* (2013.01); *G01C 21/362* (2013.01); *G05D 1/0016* (2013.01)

(58) Field of Classification Search
CPC .............. G05D 1/0212; G05D 1/0016; G01C 21/3461; G01C 21/362
USPC ............................................. 701/2
See application file for complete search history.

(56) References Cited

U.S. PATENT DOCUMENTS

| | | | | |
|---|---|---|---|---|
| 6,014,607 | A * | 1/2000 | Yagyu | G01C 21/3446 701/533 |
| 6,898,516 | B2 * | 5/2005 | Pechatnikov | G01C 21/32 701/411 |
| 8,433,468 | B2 | 4/2013 | Johnson et al. | |
| 8,447,455 | B2 * | 5/2013 | Matsunaga | B25J 9/1664 700/245 |
| 8,571,745 | B2 | 10/2013 | Pack et al. | |
| 9,319,831 | B2 * | 4/2016 | Vulcano | G01C 21/3626 |
| 9,321,173 | B2 | 4/2016 | Kikkeri et al. | |
| 9,791,280 | B2 * | 10/2017 | Duleba | G01C 21/20 |
| 9,869,999 | B2 * | 1/2018 | Doane | G05D 1/0044 |
| 10,341,808 | B2 * | 7/2019 | Haney | |
| 10,341,809 | B2 * | 7/2019 | Haney | |

(Continued)

*Primary Examiner* — Angelina Shudy

(57) ABSTRACT

A mobile electronic device and navigation method thereof. An electronic device of the present disclosure includes a communication module, a camera module, a sensor module, a driving module, a memory, and a processor that is functionally connected to the communication module, the camera module, the sensor module, the driving module, and the memory, the processor determining at least one service and a goal location of the electronic device for providing the at least one service, planning a path towards the goal location, and controlling the electronic device to move along the path. However, other embodiments are possible as well.

18 Claims, 17 Drawing Sheets

(56) References Cited

U.S. PATENT DOCUMENTS

| | | | |
|---|---|---|---|
| 2002/0112237 A1* | 8/2002 | Kelts | G06F 3/0481 |
| | | | 725/39 |
| 2003/0229441 A1* | 12/2003 | Pechatnikov | G01C 21/32 |
| | | | 701/411 |
| 2006/0030334 A1* | 2/2006 | Hashimoto | G01C 21/005 |
| | | | 455/456.1 |
| 2008/0109127 A1* | 5/2008 | Ozaki | G05D 1/0221 |
| | | | 701/24 |
| 2010/0174436 A1* | 7/2010 | Matsunaga | B25J 9/1664 |
| | | | 701/26 |
| 2012/0010772 A1* | 1/2012 | Pack | B25J 9/1664 |
| | | | 701/27 |
| 2012/0029753 A1* | 2/2012 | Johnson | A01D 34/008 |
| | | | 701/23 |
| 2012/0208559 A1* | 8/2012 | Svendsen | G01C 21/3611 |
| | | | 455/456.2 |
| 2013/0325325 A1* | 12/2013 | Djugash | G01C 21/3415 |
| | | | 701/425 |
| 2013/0342652 A1* | 12/2013 | Kikkeri | B25J 9/104 |
| | | | 348/46 |
| 2017/0108860 A1* | 4/2017 | Doane | G05D 1/0044 |
| 2017/0323541 A1* | 11/2017 | Mizutani | G08B 13/19621 |
| 2018/0066415 A1* | 3/2018 | Friend | E02F 9/2054 |
| 2018/0348010 A1* | 12/2018 | Coleman | G01C 21/3415 |
| 2019/0224049 A1* | 7/2019 | Creasy | A61F 9/08 |

* cited by examiner

FIG. 13

|   |   |   |   |   |   |   |   |   |
|---|---|---|---|---|---|---|---|---|
|   | 4 | 2 | 2 | 2 | 2 | 2 | 4 |   |
|   | 2 | 2 | 2 | 2 | 2 | 2 | 2 |   |
|   | 2 | 1 | 1 | 1 | 1 | 1 | 2 |   |
|   | 1 | 1 | 1 | user | 1 | 1 | 1 |   |
|   | 2 | 1 | 4 | 4 | 4 | 1 | 2 |   |
|   | 2 | 4 | 4 | 4 | 4 | 4 | 2 |   |
|   | 4 | 4 | 4 | 4 | 4 | 4 | 4 |   |
|   |   |   |   | TV |   |   |   |   |

1310

MOBILE ELECTRONIC DEVICE AND NAVIGATION METHOD THEREOF

CROSS-REFERENCE TO RELATED APPLICATIONS AND CLAIM OF PRIORITY

This application is related to and claims priority to Korean Application No. 10-2016-0152579 filed on Nov. 16, 2016, the contents of which are incorporated herein by reference.

TECHNICAL FIELD

The present disclosure relates to a mobile electronic device and navigation method thereof.

BACKGROUND

An electronic device (e.g., robot) is designed to provide users with various services. There are various types of robots including concierge service robots, talking robots, and social robots. The robots may be mainly categorized into two categories according to their mobility characteristics: immobile robot fixed at a position and mobile robot navigating in a given environment. In particular, a mobile robot may be designed to stay around a user to execute a command entered by the user.

SUMMARY

To address the above-discussed deficiencies, it is a primary object to provide a mobile robot that may be designed to navigate, according to the position of the user, to its goal location for serving the user. In this case, the goal location of the robot should be determined based on the characteristics of the robot environment or services provided by the robot. A mobile robot may significantly affect the interior design and spatial layout of a home because of the mobility of the robot. If the robot is located at an inappropriate position, this may have a negative impact to the spatial layout, resulting in a negative experience about the robot. The legacy robots designed only for the purposes of dedicated services may cause user inconvenience (e.g., disturbance of line of movement or sight). For example, a legacy robot designed to move to its goal location along the shortest path may unintentionally stand in user's way.

In accordance with an aspect of the present disclosure, an electronic device is provided. The electronic device includes a communication module, a camera module, a sensor module, a driving module, a memory, and a processor that is functionally connected to the communication module, the camera module, the sensor module, the driving module, and the memory, the processor determining at least one service and a goal location of the electronic device for providing the at least one service, planning a path towards the goal location, and controlling the electronic device to move along the path.

In accordance with another aspect of the present disclosure, a navigation method of an electronic device is provided. The navigation method includes determining at least one service, determining a goal location of the electronic device for providing the at least one service, planning a path towards the goal location, and moving along the path.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase"computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc ((D), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates a diagram of a configuration of navigation information updated upon detection of a condition change according to one of various embodiments of the present disclosure;

DETAILED DESCRIPTION

Figure 1:
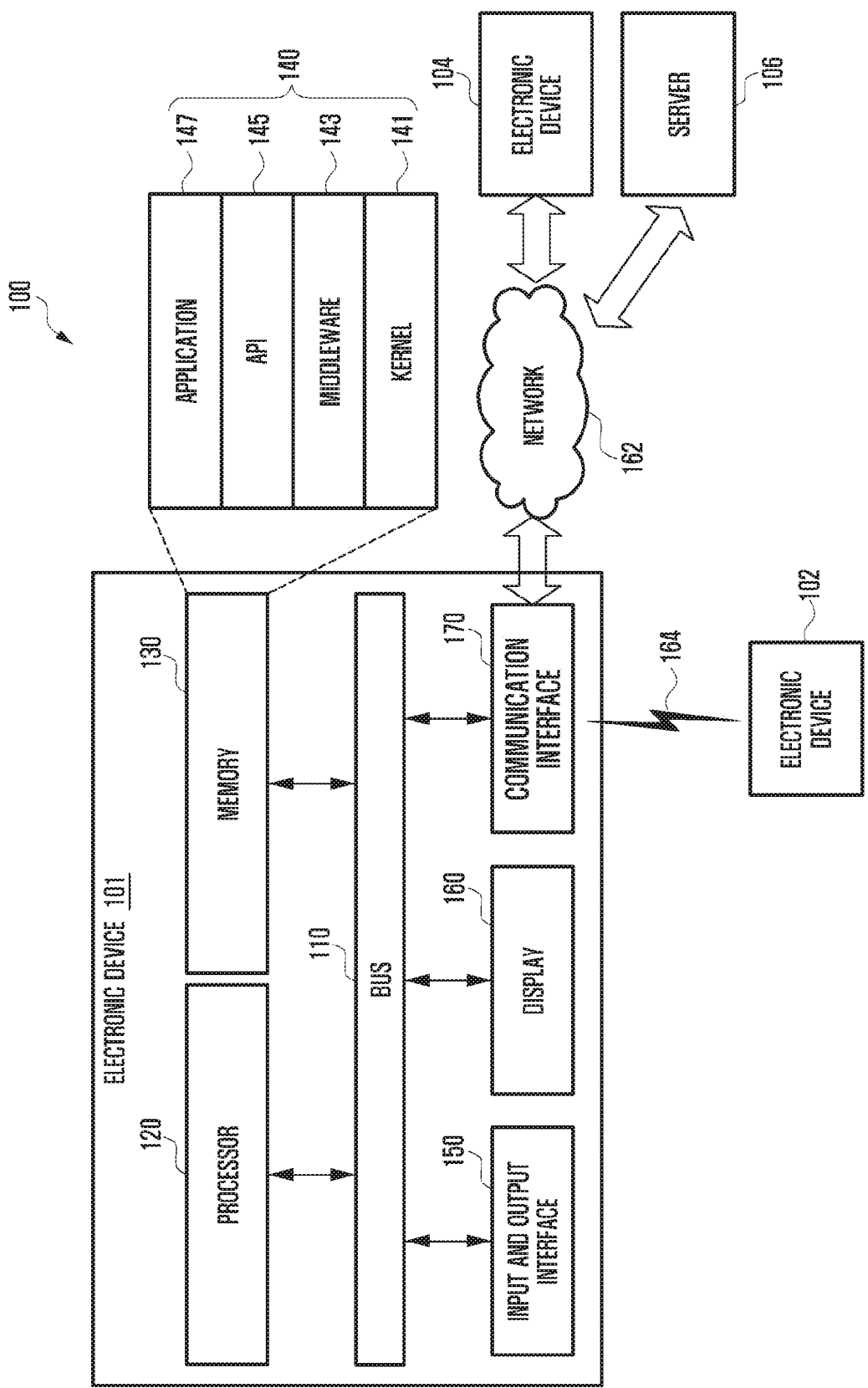
FIG. 1 illustrates a diagram of a network environment including an electronic device according to one of various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered to be limited thereto. The same reference numerals are used throughout the drawings to refer to the same or like parts.

An expression "comprising" or "may comprise" used in the present disclosure indicates presence of a corresponding function, operation, or element and does not limit an additional at least one function, operation, or element. The term "comprise" or "have" used herein indicates presence of a characteristic, numeral, step, operation, element, component, or combination thereof described in the Specification and does not exclude presence or addition of at least one other characteristic, numeral, step, operation, element, component, or combination thereof.

In the present disclosure, the term "or" includes any combination or the entire combination of together listed words. For example, "A or B" may include A, B, or A and B.

Expressions such as "a first" and "a second" in the present disclosure may represent various elements of the present disclosure, but do not limit corresponding elements, e.g., do not limit order and/or importance of corresponding elements, but may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that a first element is "coupled" to another element, such as a second element, the first element may be "directly coupled" to the second element or "electrically coupled" to the second element through a third element. However, when it is described that a first element is "directly coupled" to a second element, no third element may exist between the first and second elements.

Terms used in the present disclosure are not intended to limit the present disclosure but to illustrate embodiments of the present disclosure. When using in a description of the present disclosure and the appended claims, a singular form includes a plurality of forms unless it is explicitly differently represented.

Unless differently defined, terms including a technical term and a scientific term used herein have the same meaning as may be generally understood by a person of common skill in the art. It should be understood that generally using terms defined in a dictionary have a meaning corresponding to that of a context of related technology and are not understood to have an ideal or excessively formal meaning unless explicitly defined.

In this disclosure, an electronic device may have a communication function. For example, an electronic device may be a smart phone, a tablet PC, a mobile phone, a video phone, an e-book reader, a desktop PC, a laptop PC, a netbook computer, a PDA (personal digital assistant), a PMP (portable multimedia player), an MP3 player, a portable medical device, a digital camera, or a wearable device, such as an HMD (head-mounted device) in the form of electronic glasses, electronic clothes, an electronic bracelet, an electronic necklace, an electronic appcessory, or a smart watch.

According to some embodiments, an electronic device may be a smart home appliance that involves a communication function, such as a TV (television), a DVD (digital video disk) player, audio equipment, a refrigerator, an air conditioner, a vacuum cleaner, an oven, a microwave, a washing machine, an air cleaner, a set-top box, a TV box, such as Samsung HomeSync™, Apple TV™, and Google TV™, a game console, an electronic dictionary, an electronic key, a camcorder, or an electronic picture frame.

According to some embodiments, an electronic device may be a medical device, such as MRA (magnetic resonance angiography), MRI (magnetic resonance imaging), CT (computed tomography), and ultrasonography, a navigation device, a GPS (global positioning system) receiver, an EDR (event data recorder), an FDR (flight data recorder), a car infotainment device, electronic equipment for ship, such as a marine navigation system or a gyrocompass), avionics, security equipment, or an industrial or home robot.

According to some embodiments, an electronic device may be furniture or part of a building or construction having a communication function, an electronic board, an electronic signature receiving device, a projector, or various measuring instruments, such as a water, electric, gas, or a wave meter. An electronic device disclosed herein may be one of the above-mentioned devices or any combination thereof. As well understood by those skilled in the art, the above-mentioned electronic devices are not to be considered as a limitation of the present disclosure.

According to embodiments, the electronic device may control the activation of a second sensor, based on a signal received through a first sensor, which reduces power consumption of the electronic device compared to a conventional device, in which the second sensor is always activated. The electronic device according to embodiments of the present disclosure may perform a predefined function in response to the signal received through the second sensor.

FIG. 1 illustrates a block diagram 100 of an electronic apparatus according to an embodiment of the present disclosure.

Referring to FIG. 1, the electronic device 101 may include a bus 110, a processor 120, a memory 130, a user input module (i.e., input/output interface) 150, a display 160, and a communication interface 170.

The bus 110 may be a circuit for interconnecting elements of the electronic device 101 and for allowing a communication, such as by transferring a control message, between the elements.

The processor 120 can receive commands from the memory 130, the user input module 150, the display 160, and the communication interface 170, through the bus 110, can decipher the received commands, and perform operations and/or data processing according to the deciphered commands.

The memory 130 can store commands received from the processor 120 and/or other elements, and/or commands and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or combinations of at least two thereof.

The kernel 141 can control and/or manage system resources used for execution of operations and/or functions implemented in other programming modules, such as the middleware 143, the API 145, and/or the applications 147, and can provide an interface through which the middleware 143, the API 145, and/or the applications 147 can access and then control and/or manage an individual element of the electronic device 101.

The middleware 143 can perform a relay function which allows the API 145 and/or the applications 147 to communicate with and exchange data with the kernel 141. In relation to operation requests received from at least one of applications 147, the middleware 143 can perform load balancing in relation to the operation requests by giving a priority in using a system resource, e.g. the bus 110, the processor 120, and/or the memory 130, of the electronic device 101 to at least one application from among the at least one of the applications 147.

The API 145 is an interface through which the applications 147 can control a function provided by the kernel 141 and/or the middleware 143, and may include at least one interface or function for file control, window control, image processing, and/or character control.

The user input module 150 can receive a command and/or data from a user, and transfer the received command and/or data to the processor 120 and/or the memory 130 through the bus 110. The display 160 can display an image, a video, and/or data to a user.

The communication interface 170 can establish a communication between the electronic device 101 and another electronic devices 102 and 104 and/or a server 164, and can support short range communication protocols, e.g. a wireless fidelity (WiFi) protocol, a BlueTooth (BT) protocol, and a near field communication (NFC) protocol, communication networks, e.g. Internet, local area network (LAN), wide area network (WAN), telecommunication network, a cellular network, and a satellite network, a plain old telephone service (POTS), or any other similar and/or suitable communication networks, such as network 162. Each of the electronic devices 102 and 104 may be the same type or different types of electronic devices.

Figure 2:
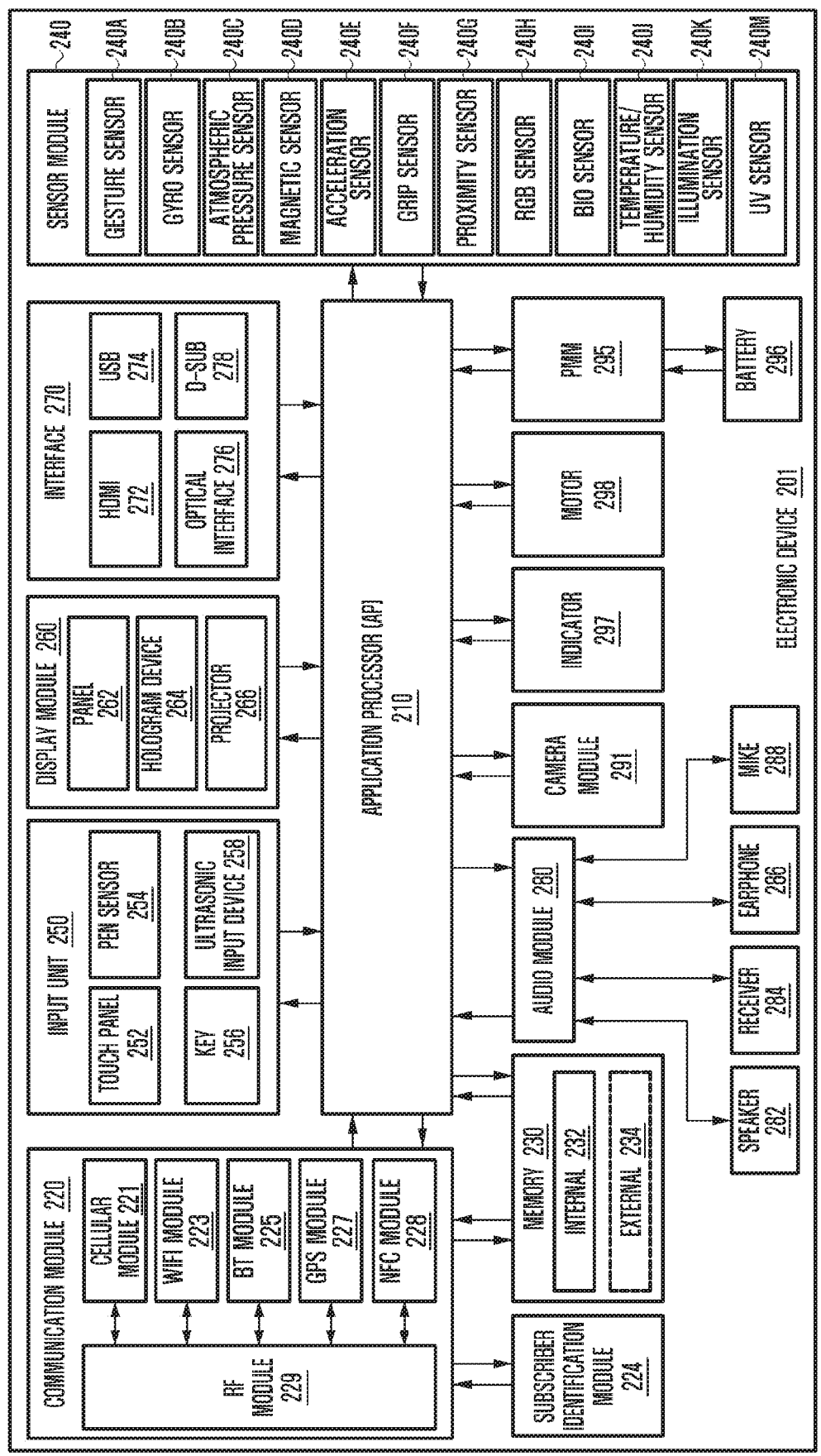
FIG. 2 illustrates a block diagram of a configuration of an electronic device according to one of various embodiments of the present disclosure.

FIG. 2 illustrates an electronic device 201 in accordance with an embodiment of the present disclosure. The electronic device 201 may form all or part of the electronic device 101 shown in FIG. 1.

Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of a system-on-chip (SoC), and may further include a graphic processing unit (GPU).

The communication module 220 may perform a data communication with any other electronic device connected to the electronic device 201 through the network. According to an embodiment, the communication module 220 may include therein a cellular module 221, a WiFi module 223, a BT module 225, a GPS module 227, an NFC module 228, and an RF (radio frequency) module 229.

The cellular module 221 may offer a voice call, a video call, a message service, or an Internet service through a communication network, such as long term evolution (LTE), LTE-advanced (LTE-A), code division multiple access (CDMA), wideband CDMA (WCDMA), universal mobile telecommunications system (UNITS), WiBro, or global system for mobile communication (GSM). Additionally, the cellular module 221 may perform identification and authentication of the electronic device in the communication network, using the SIM card 224. According to an embodiment, the cellular module 221 may perform at least part of functions the AP 210 can provide, such as a multimedia control function.

According to an embodiment, the cellular module 221 may include a communication processor (CP), and may be formed of an SoC, for example. Although some elements such as the cellular module 221, such as the CP, the memory 230, or the power management module 295 are shown as separate elements being different from the AP 210 in FIG. 2, the AP 210 may be formed to have at least part of the above elements in an embodiment of the present disclosure.

According to an embodiment, the AP 210 or the cellular module 221 may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 illustrates the cellular module 221, the WiFi module 223, the BT module 225, the GPS module 227 and the NFC module 228 as different blocks, at least two of these modules may be contained in a single IC (integrated circuit) chip or a single IC package, i.e., may be formed as a single SoC.

The RF module 229 may transmit and receive RF signals or any other electric signals, and may include a transceiver, a PAM (power amp module), a frequency filter, or an LNA (low noise amplifier). The RF module 229 may further include any component, e.g., a wire or a conductor, for transmission of electromagnetic waves in a free air space. Although FIG. 2 illustrates that the cellular module 221, the WiFi module 223, the BT module 225, the GPS module 227 and the NFC module 228 share the RF module 229, at least one of these modules may perform transmission and reception of RF signals through a separate RF module in an embodiment of the present disclosure.

The SIM card 224 may be a specific card formed of SIM and may be inserted into a slot formed at a certain location of the electronic device. The SIM card 224 may contain therein an ICCID (integrated circuit card identifier) or an IMSI (international mobile subscriber identity).

The memory 230 may include an internal memory 232 and an external memory 234. The internal memory 232 may include at least one of a volatile memory, such as DRAM (dynamic random access memory), SRAM (static RAM), SDRAM (synchronous DRAM), or a nonvolatile memory, such as OTPROM (one time programmable read-only memory), PROM (programmable ROM), EPROM (erasable and programmable ROM), EEPROM (electrically erasable and programmable ROM), mask ROM, flash ROM, NAND flash memory, and NOR flash memory.

According to an embodiment, the internal memory 232 may have the form of an SSD (solid state drive). The external memory 234 may include a flash drive, e.g., CF (compact flash), SD (secure digital), Micro-SD (micro secure digital), Mini-SD (mini secure digital), xD (extreme digital), or memory stick, and may be functionally connected to the electronic device 201 through various interfaces. The electronic device 201 may further include a storage device or medium such as a hard drive.

The sensor module 240 may measure physical quantity or sense an operating status of the electronic device 201, and then convert measured or sensed information into electric signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as an RGB (red, green, blue) sensor, a biometric sensor 240I, a temperature-humidity sensor 240J, an illumination sensor 240K, and a UV (ultraviolet) sensor 240M. Additionally or alternatively, the sensor module 240 may include an E-nose sensor, an EMG (electromyography) sensor, an EEG (electroencephalogram) sensor, an ECG (electrocardiogram) sensor, an IR (infrared) sensor, an iris scan sensor, or a finger scan sensor. The sensor module 240 may include a control circuit for controlling one or more sensors equipped therein.

The input unit 250 may include a touch panel 252, a digital pen sensor 254, a key 256, or an ultrasonic input device 258. The touch panel 252 may recognize a touch input in a capacitive, resistive, infrared, or ultrasonic type manner. The touch panel 252 may further include a control circuit. In case of a capacitive type, a physical contact or proximity may be recognized. The touch panel 252 may further include a tactile layer that offers a tactile feedback to a user.

The digital pen sensor 254 may be formed in the same or similar manner as receiving a touch input or by using a separate recognition sheet. The key 256 may include a physical button, an optical key, or a keypad. The ultrasonic input device 258 is capable of identifying data by sensing sound waves with a microphone (MIC) 288 in the electronic device 201 through an input tool that generates ultrasonic signals, thus allowing wireless recognition. According to an embodiment, the electronic device 201 may receive a user input from any external device connected thereto through the communication module 220.

The display 260 may include a panel 262, a hologram device 264, or a projector 266. The panel 262 may be LCD (liquid crystal display), or AM-OLED (active matrix organic light emitting diode)may have a flexible, transparent or wearable form, and may be formed of a single module with the touch panel 252. The hologram device 264 may project a stereoscopic image in the air using interference of light. The projector 266 may project an image onto a screen, which may be located at the inside or outside of the electronic device 201. According to an embodiment, the display 260 may further include a control circuit for controlling the panel 262, the hologram device 264, and the projector 266.

The interface 270 may include an HDMI (high-definition multimedia interface) 272, a USB (universal serial bus) 274, an optical interface 276, and a D-sub (d-subminiature), and may be contained in the communication interface 170 shown in FIG. 1. Additionally or alternatively, the interface 270 may include an MHL (mobile high-definition link) interface, an SD (secure digital) card/MMC (multi-media card) interface, or an IrDA (infrared data association) interface.

The audio module 280 may perform a conversion between sounds and electric signals. At least part of the audio module 280 may be contained in the input/output interface 150 shown in FIG. 1. The audio module 280 may process sound information inputted or outputted through a speaker 282, a receiver 284, an earphone 286, or the MIC 288.

The camera module 291 is capable of obtaining still images and moving images, and may include at least one image sensor, such as a front sensor or a rear sensor, a lens, an ISP (image signal processor), or a flash, such as LED or xenon lamp.

The power management module 295 may manage electric power of the electronic device 201 and may include a PMIC (power management integrated circuit), a charger IC, or a battery gauge.

The PMIC may be formed of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include a magnetic resonance type, a magnetic induction type, or an electromagnetic type. Any additional circuit for a wireless charging may be further used, such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 201. The battery 296 may be a rechargeable or solar battery.

The indicator 297 may illustrate thereon a current status, such as a booting, message, or recharging status of part or all of the electronic device 201. The motor 298 may convert an electric signal into a mechanical vibration. The electronic device 201 may include a specific processor, such as GPU, for supporting a mobile TV. This processor may process media data that comply with standards of DMB (digital multimedia broadcasting), DVB (digital video broadcasting), or media flow.

Each of the above-discussed elements of the electronic device disclosed herein may be formed of one or more components, and may have various names according to the type of the electronic device. The electronic device disclosed herein may be formed of at least one of the above-discussed elements without some elements or with additional elements. Some of the elements may be integrated into a single entity that still performs the same functions as those of such elements before integrated.

Figure 3:
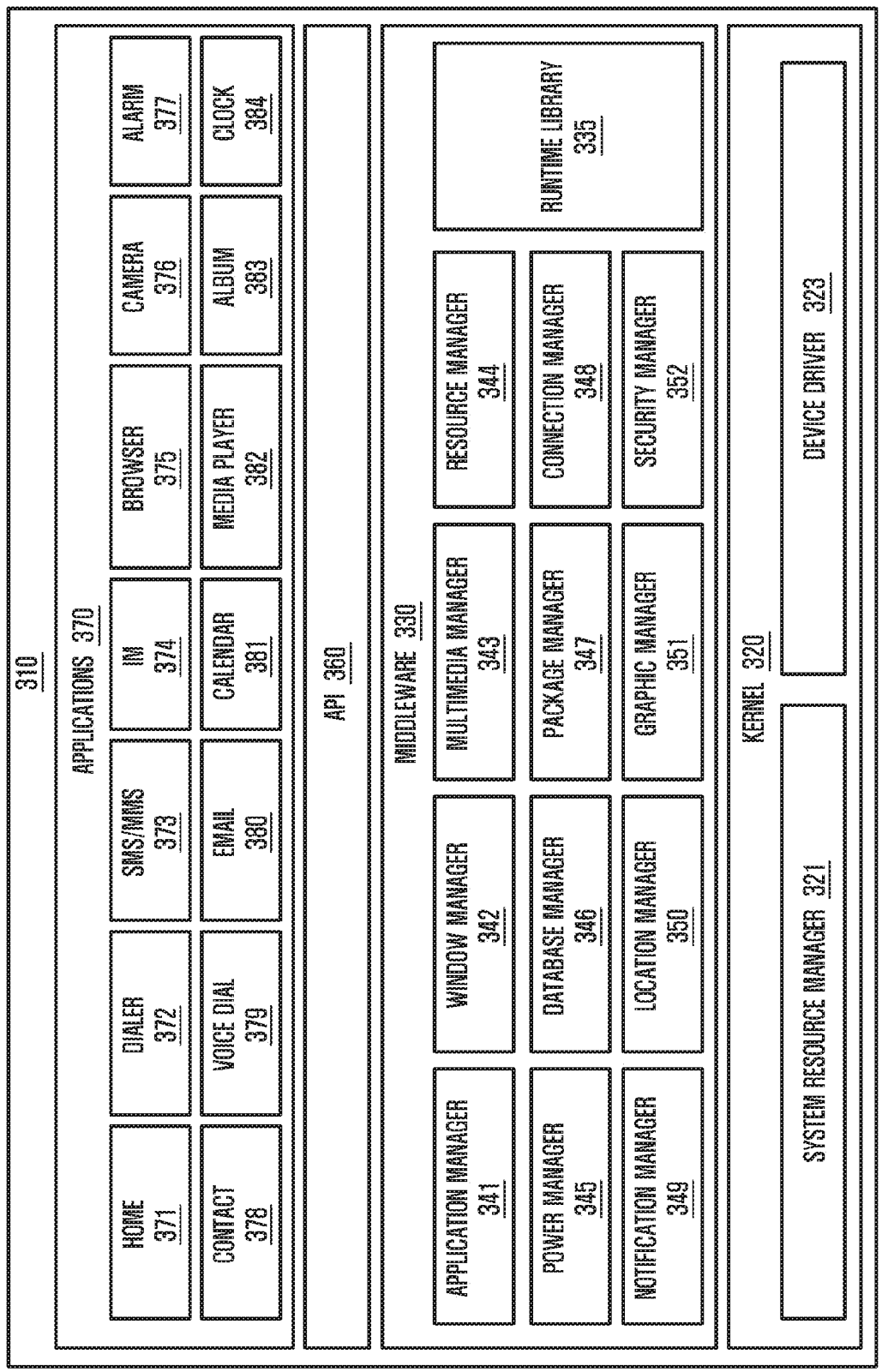
FIG. 3 illustrates a block diagram of a configuration of a program module according to one of various embodiments of the present disclosure.

FIG. 3 illustrates a configuration of a programming module 310 according to an embodiment of the present disclosure.

The programming module 310 may be stored in the electronic device 101 or may be stored in the electronic device 201 illustrated in FIG. 2. At least a part of the programming module 310 may be implemented in software, firmware, hardware, or a combination of two or more thereof. The programming module 310 may be implemented in hardware 201, and may include an OS controlling resources related to an electronic device and/or various applications 370 executed in the OS. For example, the OS may be Android, iOS, Windows, Symbian, Tizen, or Bada.

Referring to FIG. 3, the programming module 310 may include a kernel 320, middleware 330, an API 360, and/or applications 370.

The kernel 320 may include system resource manager 321 and/or a device driver 323. The system resource manager 321 may include a process manager, a memory manager, and a file system manager. The system resource manager 321 may perform the control, allocation, or recovery of system resources. The device driver 323 may include a display driver, a camera driver, a Bluetooth driver, a shared memory driver, a USB driver, a keypad driver, a Wi-Fi driver, and/or an audio driver, and may further include an inter-process communication (IPC) driver, The middleware 330 may include multiple modules previously implemented so as to provide a function used in common by the applications 370, and may provide a function to the applications 370 through the API 360 in order to enable the applications 370 to efficiently use limited system resources within the electronic device. For example, as illustrated in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include a library module used by a complier, in order to add a new function by using a programming language during the execution of the applications 370, and may perform functions which are related to input and output, the management of a memory, or an arithmetic function.

The application manager 341 may manage a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, or a storage space, of at least one of the applications 370.

The power manager 345 may operate together with a basic input/output system (BIOS), may manage a battery or power, and may provide power information used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as Wi-Fi and Bluetooth. The notification manager 349 may display or report, to the user, an event such as an arrival message, an appointment, or a proximity alarm, in such a manner as not to disturb the user. The location manager 350 may manage location information of the electronic device. The graphics manager 351 may manage graphic effects, which are to be provided to the user, and/or a user interface related to the graphic effects. The security manager 352 may provide various security functions used for system security and user authentication. According to an embodiment of the present disclosure, when the electronic device has a telephone function, the middleware 330 may further include a telephony manager for managing a voice and/or video telephony call function of the electronic device.

The middleware 330 may generate and use new middleware module through various functional combinations of the above-described internal element modules, may provide modules specialized according to types of OSs in order to provide differentiated functions, and may dynamically delete some of the existing elements, or may add new elements. Accordingly, the middleware 330 may omit some of the elements described in the embodiments of the present disclosure, may further include other elements, or may replace the some of the elements with elements, each of which performing a similar function and having a different name.

The API 360 is a set of API programming functions, and may be provided with a different configuration according to an OS. In the case of Android or iOS, for example, one API set may be provided to each platform. In the case of Tizen, two or more API sets may be provided to each platform.

The applications 370 may include a preloaded application and/or a third party application, and may include a home 371, dialer 372, a short message service (SMS)/multimedia messaging service (MMS) 373, instant message (IM) 374, browser 375, camera 376, alarm 377, contact 378, voice dial 379, electronic mail (e-mail) 380, calendar 381, media player 382, album 383, and clock application 384, and any other suitable and/or similar application.

At least a part of the programming module 310 may be implemented by instructions stored in a non-transitory computer-readable storage medium. When the instructions are executed by one or more processors, the one or more processors may perform functions corresponding to the instructions. The non-transitory computer-readable storage medium may be the memory 230. At least a part of the programming module 310 may be executed by the one or more processors 210, and may include a module, a program, a routine, a set of instructions, and/or a process for performing one or more functions.

Figure 4:
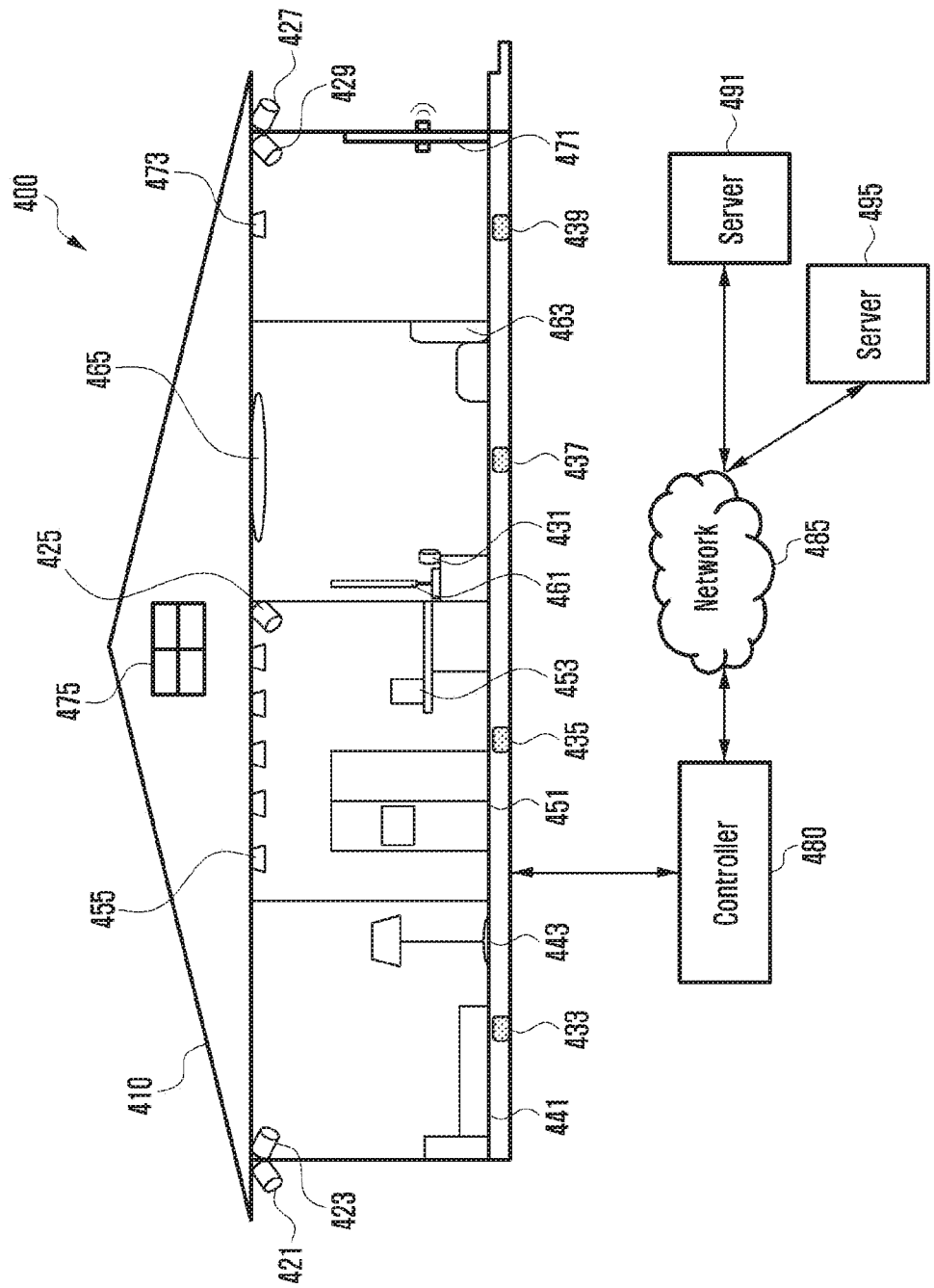
FIG. 4 illustrates a diagram of a smart home environment according to one of various embodiments of the present disclosure.

FIG. 4 illustrates a diagram of a smart home environment according to one of various embodiments of the present disclosure.

FIG. 4 depicts a smart home environment 400 according to one of various embodiments of the present disclosure.

According to various embodiments, the smart home environment 400 may include one or more cameras 421, 423, 425, 427, 429, and 431, one or more sensors or devices including a sensor (e.g., floor microphones 433, 435, 437, and 439), main room objects (a bed 411 and a lamp stand 443), kitchen objects (a refrigerator 451, a coffee machine 453, and electric lamps 455), living room objects (a television (TV) 461, a sofa 463, and an electric lamp 465), hallway objects (a door 471 and an electric lamp 473), windows 475, a controller 480, a network 485, and one or more external servers 491 and 495. The controller 480 may be included in a robot. The controller 480 may include an electronic device for controlling or interoperating with the robot.

According to various embodiments, the controller 480 may monitor to locate humans by means of at least one of the cameras 421 to 431. For example, the controller 480 may detect a person who enters into or exits out of the house through the door 471 by means of the camera 427. The controller 480 may also detect a person who enters into, leaves from, or stays in a predetermined location (e.g., main room, kitchen, living room, and hallway) by means of the cameras 423, 425, 429, and 431. According to another embodiment, the controller 480 may detect a person who wanders around or intrudes into the house, by means of the camera 421. The controller 480 may also identify a person by means of at least one of the cameras 421 to 431. For example, the controller 480 may determine whether the detected person is a registered person (a resident) or not (e.g., an intruder or a guest).

According to various embodiments, the controller 480 may detect positions of persons by means of the floor microphones 433, 435, 437, and 439. For example, the controller 480 may determine the presence of a person in the main room based on the footstep sound collected by the floor microphone 433. Furthermore, the controller 480 may identify a person by comparing the characteristics (e.g., strength, pattern, and frequency) of the footstep sounds acquired by the floor microphone 433 with the footstep sound samples of the previously registered persons. For example, in a family made up of a mother, a father, and a child, the controller 480 may identify the father based on the footstep sound that is loudest and has an inter-step interval of about 1 to 2 seconds. The controller 480 may also identify the mother based on the footstep sound that is intermediate in loudness and has an inter-step interval of about 2 to 3 seconds. The controller 480 may also identify the child based on the footstep sound that is weak in loudness and has an inter-step interval of about 1 to 2 seconds. For example, the controller 480 may identify persons based on various characteristics of footstep sounds such as inter-step interval, left-to-right foot stepping characteristic, and right-to-left foot stepping characteristic. If the detected footstep sound has unlearned footstep sound characteristics or predetermined footstep characteristics, the controller 480 may determine that there is an intrusion.

According to various embodiments, the controller 480 may locate a position of a person by means of the floor microphones 433, 435, 437, and 439. For example, the controller 480 may locate the accurate position of the person by calculating the distances from the floor microphones 433, 435, 437, and 439 to the person using the triangulation method. For example, the controller 480 may locate a person close to or approaching the TV 461 or the sofa 463 in the living room. The controller 480 may also locate a person close to or approaching the refrigerator 451 or the coffee machine 453 in the kitchen. The controller 480 may also detect the movement direction of a person from the kitchen to the main room or the living room. Although the description has been directed to an exemplary case where the microphones are mounted on the floor, the microphones may be mounted on various objects. For example, the microphones may be mounted on the ceiling, lamps, furniture, and electronic devices.

According to various embodiments, the controller 480 may locate the position of a person based on the information received from various objects such as the bed 441, the lamp stand 443, the refrigerator 451, the coffee machine 453 the TV 461, and the sofa 463.

According to various embodiments, the bed 441 or the sofa 463 may have at least one of a motion sensor, a weight sensor, an acceleration sensor, a capacitance sensor, and a pressure sensor. The lamp stand 443 may have a motion sensor. The lamp stand 443 may provide information of an on/off state. The refrigerator 451 may have at least one of a motion sensor, a camera, a door open sensor, and an acceleration sensor. The refrigerator 451 may provide information on items being put into and taken out of the refrigerator 451. The refrigerator 451 may provide information whether its door is open. The coffee machine 453 may have a motion sensor. The coffee machine 453 may provide information of an on/off state. The coffee machine 453 may provide information on the type of coffee brewed. The lamps 455, 465, 473 may have a motion sensor. The lamps 455, 465, 473 may provide information of an on/off state. The TV 461 may have a motion sensor, a camera, and a microphone. The TV 461 may provide information of an on/off state. The TV 641 may also provide information on contents being consumed. Each of the door 471 and the window 475 may include at least one of a motion sensor, an acceleration sensor, a door open sensor, and a biometric sensor. Each of the door 471 and the window 475 may provide door open information and information on the persons who come in and go out of the home. Each of the door 471 and the window 475 may provide information on the pressure applied thereto or illegal intrusion activity thereon.

According to various embodiments, one or more sensors or the devices having at least one of the aforementioned sensors may also have a radio communication unit capable of communicating radio signals with a portable electronic device (e.g., a mobile phone and a smart bracelet) and executing a command conveyed by a signal from the portable electronic device.

According to various embodiments, the controller 480 may locate the position of a user and identify the user based the information collected by various sensors. The controller 480 may transmit the information collected by the sensors to a server 491 to locate the position of a user and identify the user. The controller 480 may provide the server 491 with the information collected by various sensors.

According to various embodiments, the controller 480 may determine the settings of the sensors based on supplementary information such as currently running electronic devices, current time, and learned user behavior pattern. For example, if it is sensed that a user has been lying on the bed over a predetermined time period in the main room in which the lamp is turned off, the controller 480 may determine that the user is asleep. In this case, the controller 480 may configure the sensors with sleep settings (e.g., one time per 20 minutes in the early evening and one time per 5 minutes around dawn).

According to various embodiments, the controller 480 may determine the type of a sensor for use among the sensors deployed in the main room. The controller 480 may determine the type of a sensor for use based on the supplementary information such as currently running electronic device, current time, and learned user behavior pattern. The controller 480 may apply the sleep settings to the kitchen and the living room. While the main room is configured with the sleep settings, the living room and the kitchen may be configured with monitoring settings. The monitoring settings may be set such that one of the camera and the motion sensor is running.

According to various embodiments, the controller 480 may be part of a mobile phone, a tablet PC, or a wearable electronic device. The controller 480 may be a part of an electronic device such as a TV a refrigerator, a set-top box, and a game console. Although the controller 480 is depicted as a separate block for convenience of explanation, the functions of the controller 480 may be implemented in at least one of various objects or devices.

Although FIG. 4 exemplifies the operations of the electronic device (e.g., robot) in a smart home environment, the present disclosure is not limited to the smart home environment, and it may be applied to various environments (e.g., indoor environment and outdoor environment of a building). The term "robot" is intended to include electronic devices equipped with a driving module so as to move autonomously. The servers 491 and 495 of FIG. 4 may be equivalent to the server 106 of FIG. 1, and the network 485 of FIG. 4 may be equivalent to the network 162 of FIG. 1.

Figure 5:
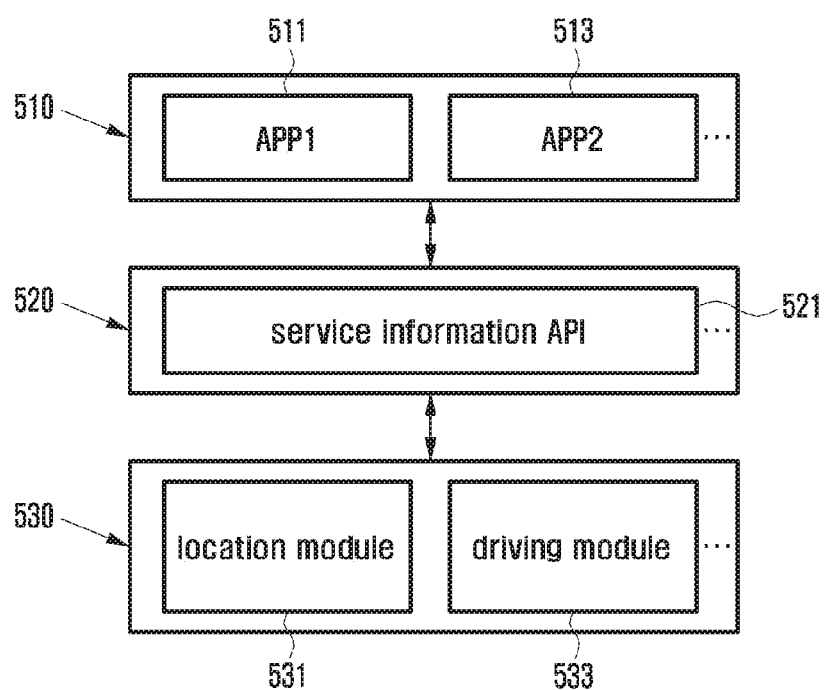
FIG. 5 illustrates a diagram of a schematic configuration of an electronic device for navigation according to one of various embodiments of the present disclosure.

FIG. 5 illustrates a diagram of a schematic configuration of an electronic device for navigation according to one of various embodiments of the present disclosure.

According to various embodiments, an application layer 510 may transfer service provision location information (e.g., service distance information, keep-out zone information, and combination of service distance information and keep-out zone information) to a framework layer 530 via an API layer 520 (e.g., service information API 521). The electronic device 101 is designed to allow for installing and executing applications thereon. For example, a first and a second application 511 and 513 may be installed in the electronic device 101 to reside in the application layer 510, and the electronic device 101 may acquire information on application-specific service provision location from at least one of the first and second application 511 and 513. The electronic device 101 may determine a goal location based on the acquired information and move to the goal position.

According to various embodiments, the electronic device 101 (e.g., robot) may include at least one of a location module 531, a driving module 533, a service module, a communication module, a camera module, and a sensor module belonging to the framework layer 530.

According to various embodiments, the location module 531 may be implemented in software, hardware, or a combination of both. The location module 531 may have information on the spatial structure (e.g., structural drawings and maps of house, building, and park), movement of objects (e.g., human and pet dog) in a space, electric appliances, and furniture items.

According to various embodiments, the driving module 533 may include a motor for driving the electronic device 101 and a controller controlling the motor. The service module may control the electronic device 101 to provide the user with a service (e.g., music playback, voice command execution, and still and motion picture shooting). For example, the service module may include at least one processor. The communication module 220 may include an antenna for communication with an external electronic device (e.g., external camera, smartphone, and home hub) and a processor. The camera module 291 may include at least one of diverse types of cameras including a CMOS camera, an infrared camera, and a stereo camera. The sensor module 240 may include at least one of diverse sensors including an illuminance sensor 240K, a temperature/humidity sensor 240J, and a UWB sensor.

According to various embodiments, the electronic device 101 may determine its goal location based on the service provision location information corresponding to at least one service that it provides and moves to the goal location. The service provision location information may include information on the location appropriate for providing the service to the user. For example, the service provision location information may include information on a type of a service and whether to stay around the user depending on the emotion of the user.

According to various embodiments, the electronic device 101 may acquire information on the condition change of the user and determine and move to a new goal location based on the condition change. For example, if the user is using another electronic device, the electronic device 101 may move to a location to avoid disturbing interaction between the user and the other device. If it is determined to move, the electronic device 101 may determine the goal location based on the service provision location information. For example, the electronic device 101 may acquire the information on a keep-out zone in moving to the goal location and determine its moving path by referencing this information.

Figure 6:
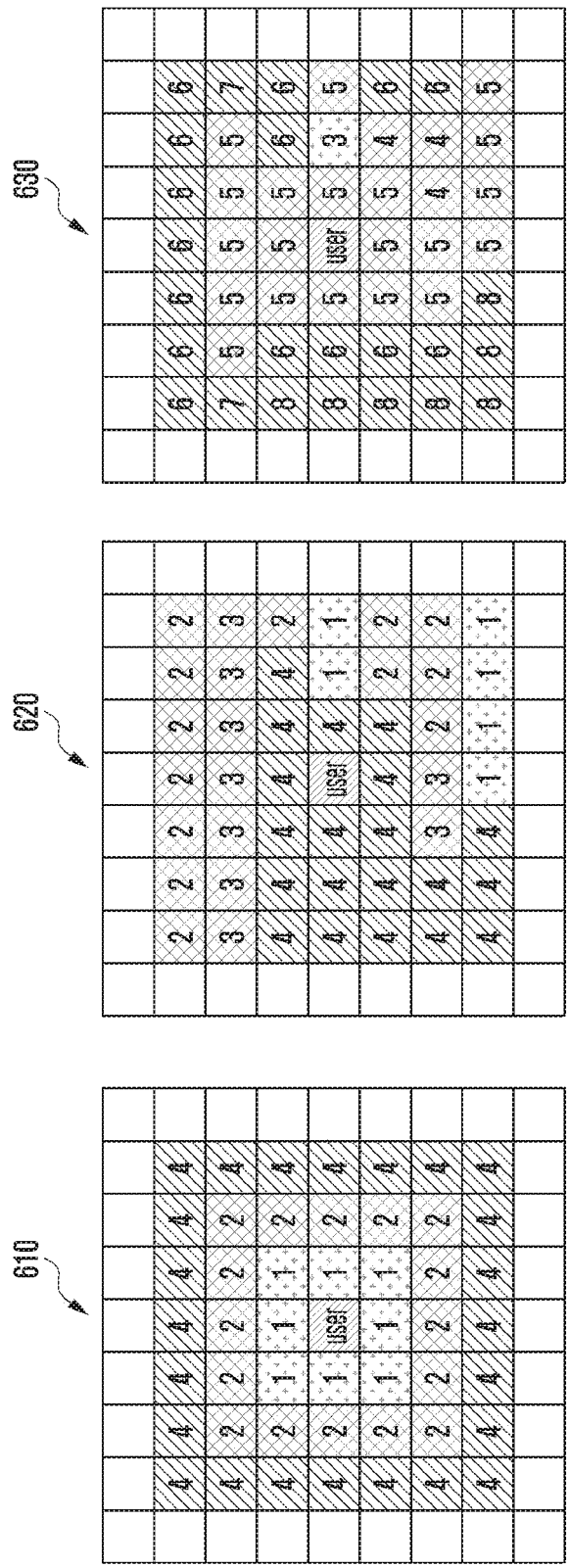
FIG. 6 illustrates a diagram of a navigation method of an electronic device according to one of various embodiments of the present disclosure.

FIG. 6 illustrates a diagram of a navigation method of an electronic device according to one of various embodiments of the present disclosure.

FIG. 6 is provided to explain a navigation method of the electronic device 101 (e.g., robot). Part 610 of FIG. 6 depicts a configuration of service distance information for use in determining the goal location appropriate for serving the user. For example, the service distance information may be stored in the form of a map indicating distances from the user's current location. According to various embodiments, the service distance information may be expressed in the form of a grid comprised of cells. Each cell is marked with a number indicating the distance from the current location of the user; as the number decreases, the location is more suitable for serving the user. For example, if the electronic device 101 is configured to provide a voice command service, it is preferable for the electronic device 101 to be close to the user for serving the user as shown in part 610 of FIG. 6.

According to various embodiments, part 620 of FIG. 6 depicts a configuration of service distance information including information on keep-out zone which the electronic device 101 is barred from entering. If the electronic device 101 is configured to be close to the user or any cell marked with "1" unconditionally to serve the user, this may cause user inconvenience. In order to overcome this, the electronic device 101 may be configured to reference the keep-out zone information. The keep-out zone information may be stored in the form of a map with the cells configured to keep the electronic device 101 away therefrom. According to various embodiments, the keep-out zone information may include user behavior pattern, user input, current zone where the electronic device 101 is located, and arrangement of electric appliances and furniture.

According to various embodiments, the electronic device 101 may determine navigation information configured as shown in part 630 of FIG. 6 based on the information on the locations appropriate for serving the user (e.g., serving distance information as shown in part 610 of FIG. 6) and the information on the locations at which it may disturb the user keep-out zone information as shown in part 620 of FIG. 6). The navigation information may be stored in the form of a map along with the information on the locations appropriate for serving the user and the information on the locations at which it may disturb the user. According to various embodiments, the best location of the electronic device 101 for serving the user may be marked with the number "3" as shown in part 630 of FIG. 6. If the current location of the electronic device 101 is not the cell marked with "3", the electronic device 101 may plan a path towards the cell marked with "3" based on the navigation information. For example, the electronic device 101 may determine the moving path based on the numbers of the cells in such a way of minimizing the sum of the numbers of the cells on the path.

Although the description is made with a grid comprised of cells marked with specific numbers (i.e., 1 to 8) for convenience of explanation, the present disclosure is not limited thereby. Although the description is made with an exemplary case of using the serving distance information and the keep-out zone information that are configured as shown in parts 610 and 620 of FIG. 6 respectively, the present disclosure is not limited thereto. For example, the present disclosure may also be implemented by using at least one of the information on the structure of the space to which the electronic device 101 belongs, furniture arrangement information, and electric appliances information in a substitution manner or an addition manner. The present disclosure may also be implemented using one or more information items. Although the description is made with a 2-dimensional (2D) map and coordinates, the present disclosure is not limited thereby, and it may be implemented with higher dimensional maps and coordinates. Although the description is made with the specific term "map" to help understand the present disclosure, the present disclosure is not limited by any particular term.

Figure 7:
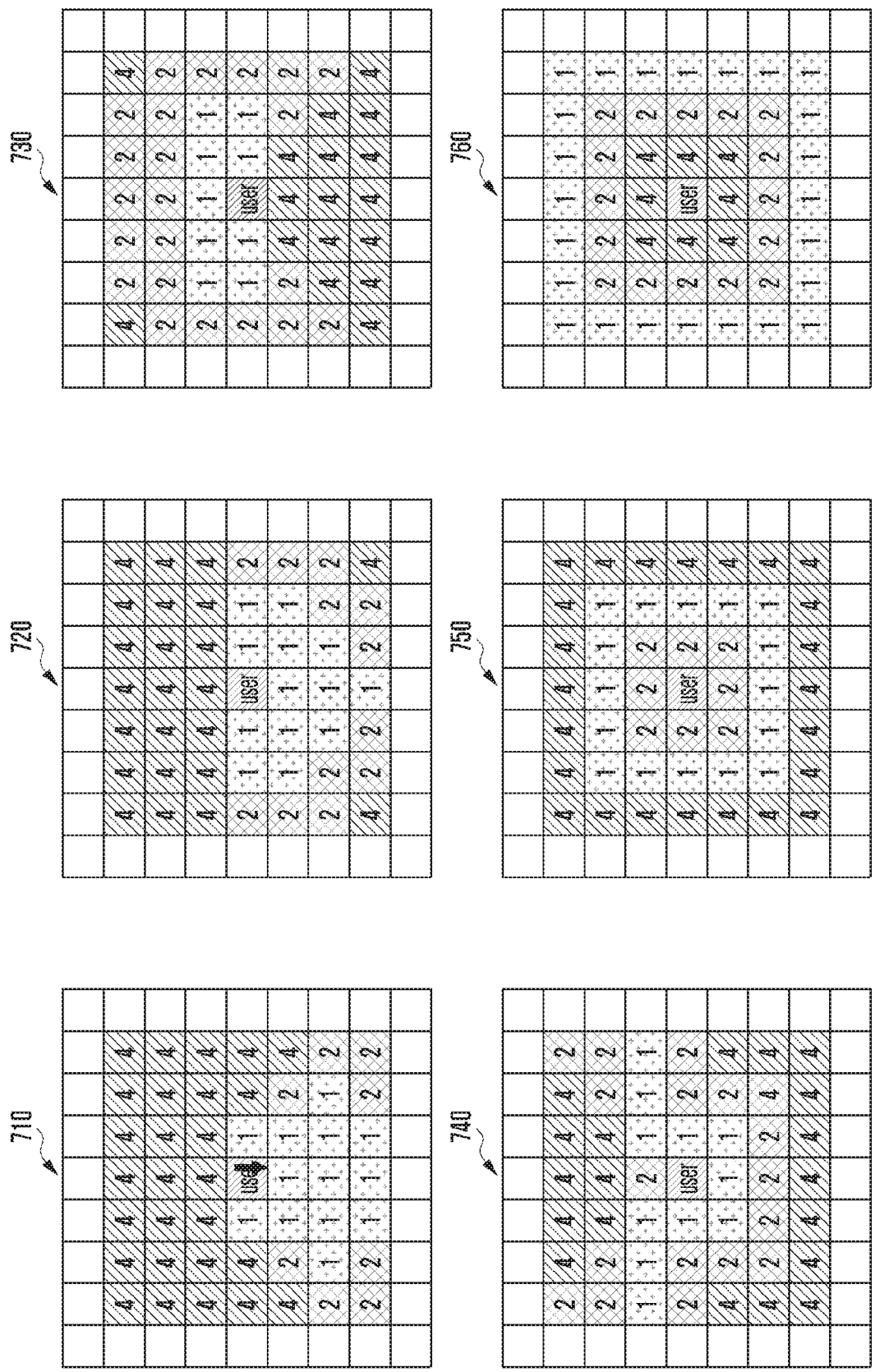
FIG. 7 illustrates a diagram of exemplary configurations of service distance information of an electronic device according to various embodiment of the present disclosure.

FIG. 7 illustrates a diagram of exemplary configurations of service distance information of an electronic device according to various embodiment of the present disclosure.

According to various embodiments, the service distance information of the electronic device 101 may be stored in one of various formats depending on the type of service provided by the electronic device 101. For example, assuming that the main orientation of the user's line of sight is downward (e.g., 6 o'clock direction), the service distance information may be configured in various formats as shown in parts 710 to 760 of FIG. 7.

According to various embodiments, in the case of a service requiring that the electronic device 101 is located within a line of sight of the user, the service distance information may be provided in the form as shown in part 710 of FIG. 7. In the case of a service requiring that the electronic device 101 is mostly located in front of the user, the service distance information may be provided in the form as shown in part 720 of FIG. 7. In the case of a service requiring that the electronic device 101 is out of the line of sight of the user, the service distance information may be provided in the form as shown in part 730 of FIG. 7, In the case of a service requiring that the electronic device 101 is within the angle of 270 degrees around the line of sight of the user, the service distance information may be provided in the form as shown in part 740. In the case of a service requiring that the electronic device 101 is located not too far or near (e.g., photo shoot), the service distance information may be provided in the form as shown in part 750 of FIG. 7. In the case of a service requiring that the electronic device 101 is located far from the user, the service distance information may be provided in the form as shown in part 760 of FIG. 7.

Figure 8:
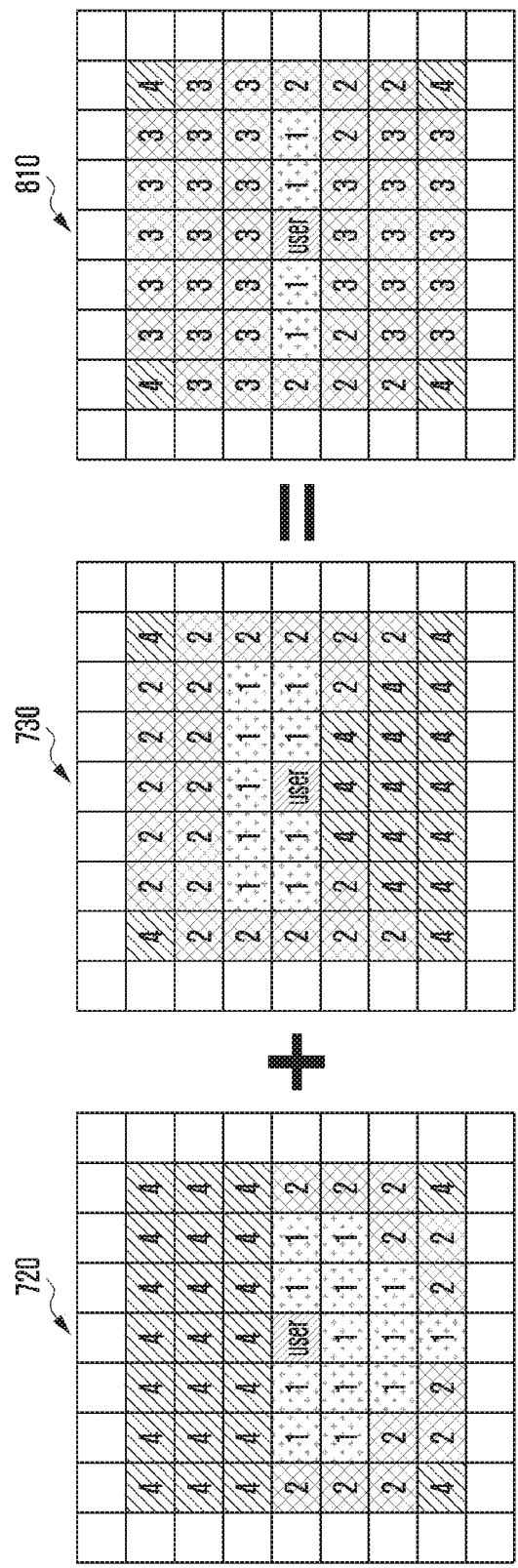
FIG. 8 illustrates a diagram of exemplary configurations of service distance information as combinations of multiple service distance information of an electronic device according to one of various embodiments of the present disclosure.

FIG. 8 illustrates a diagram of exemplary configurations of service distance information as combinations of multiple service distance information of an electronic device according to one of various embodiments of the present disclosure.

According to various embodiments, in the case that the electronic device 101 is configured to provide multiple services simultaneously, it may be possible to acquire new service distance information by combining multiple service distance information. In the case that the electronic device 101 is configured to provide the service requiring that the electronic device 101 is mostly located in front of the user and the service requiring that the electronic device 101 is out of a line of sight of the user simultaneously, the service distance information may be provided in the form as shown in part 810 of FIG. 8 as a result of combining the service distance information of parts 720 and 730 of FIG. 7.

According to various embodiments, in the case of combining multiple service distance information to generate a new service distance information, it may be possible to apply different weights to the respective services. For example, the services may be weighted based on at least one of importance of service, service provision order, and priority of service to generate a new service distance information.

Figure 9:
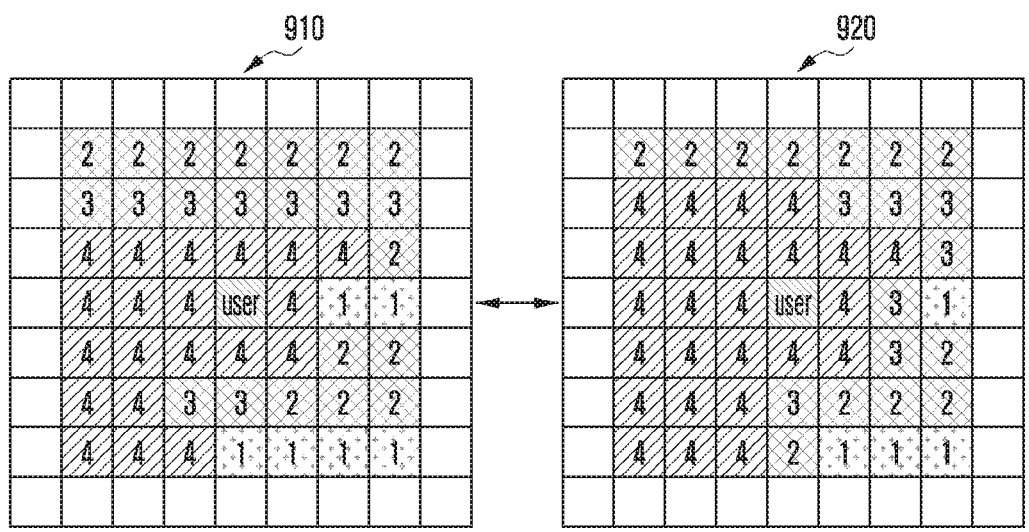
FIG. 9 illustrates a diagram of a user's emotion-based keep-out zone change for an electronic device according to one of various embodiments of the present disclosure.
Figure 10:
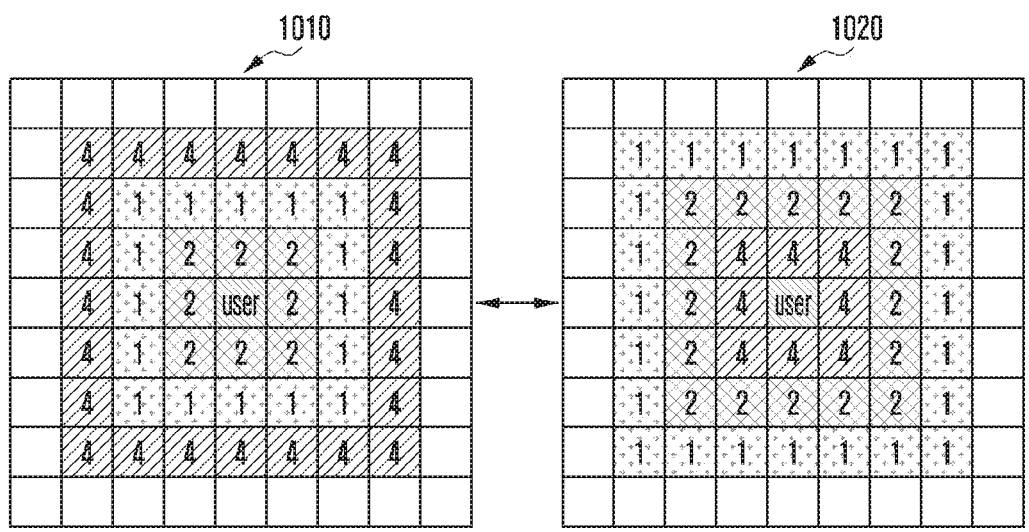
FIG. 10 illustrates a diagram of a user's emotion-based service distance information change for an electronic device according to one of various embodiments of the present disclosure.

FIG. 9 illustrates a diagram of a user's emotion-based keep-out zone change for an electronic device according to one of various embodiments of the present disclosure, and FIG. 10 illustrates a diagram of a user's emotion-based service distance information change for an electronic device according to one of various embodiments of the present disclosure.

According to various embodiments, at least part of the information for use in navigation of the electronic device 101 (e.g., service distance information and keep-out zone information) may vary according to the condition of the user. For example, the service distance information or the keep-out zone information may be changed from a first value as shown in part 910 or 1010 to a second value as shown in part 920 or 1020 when it is detected that the user's emotion is changed to an emotional state of angry.

According to various embodiments, the first value (e.g., parts 910 of FIG. 9 and 1010 of FIG. 10) or the second value (e.g., parts 920 of FIG. 9 and 1020 of FIG. 10) may include a value learned through machine learning. For example, the electronic device 101 may use the service distance information preconfigured according to the user's condition information (e.g., emotion, fatigue, physical condition, gender, age, voice, and footstep sound). The electronic device 101 may learn the feedback from the user through iterative interaction with the user. The electronic device 101 may classify the feedback into positive and negative feedback and learn the positive and negative feedback. For example, if the electronic device 101 receives negative feedback about the service repeatedly from user input at a specific location, it may change the value corresponding to at least one location (e.g., all or part of cells). Also, if the electronic device 101 experiences difficulty in providing the service at a specific location low voice recognition rate), it may change the value corresponding to the location or area around the location.

According to various embodiments, the electronic device 101 may change at least part of the information for use in its navigation based on time, weather, and season information. For example, the electronic device 101 may determine its goal location based on a value predetermined on the basis of the time, weather, and season. Also, the electronic device 101 may determine its goal location based on a value obtained as a result of learning on the basis of the time, weather, and season.

Figure 11:
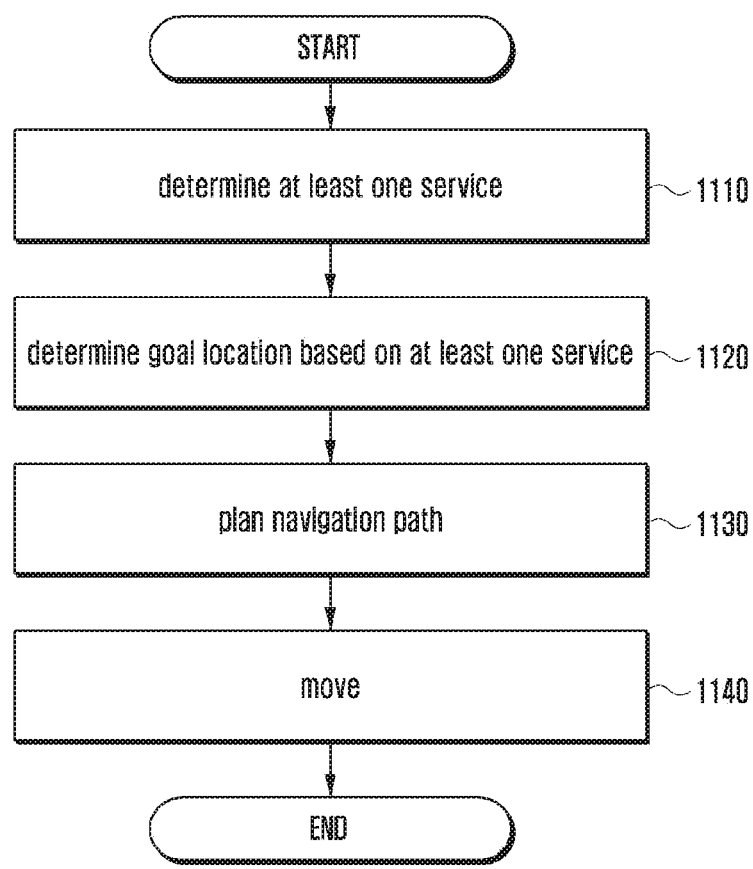
FIG. 11 illustrates a flowchart of a navigation method of an electronic device according to one of various embodiments of the present disclosure.

FIG. 11 illustrates a flowchart of a navigation method of an electronic device according to one of various embodiments of the present disclosure.

In the embodiment of FIG. 11, the electronic device 101 tray determine at least one service that it provides at step 1110. For example, the electronic device 101 may receive a user input for instructing to execute at least one of a voice command standby service, a photo shoot service, and a health care service.

According to various embodiments, the electronic device 101 may determine, at step 1120, its goal location based on the service determined at step 1110. For example, the electronic device 101 may determine its goal location for executing the service. According to various embodiments, the electronic device 101 may acquire service distance information corresponding to the selected service and determine its goal location based on the service distance information. According to various embodiments, the electronic device 101 may determine its goal location based on at least one of service distance information and keep-out zone information.

According to various embodiments, the electronic device 101 may determine, at step 1130, a path towards its goal location determined at step 1120. For example, the electronic device 101 may determine the path from the current location to the goal location. According to various embodiments, the electronic device 101 may determine a path towards its goal location based on at least one of the service distance information and the keep-out zone information.

According to various embodiments, the electronic device 101 may move, at step 1140, along the path determined at step 1130. According to various embodiments, the goal location of the electronic device 101 may be updated continuously, For example, the electronic device 101 may update its goal location little by little on the move rather than maintaining the initially determined goal location.

Figure 12:
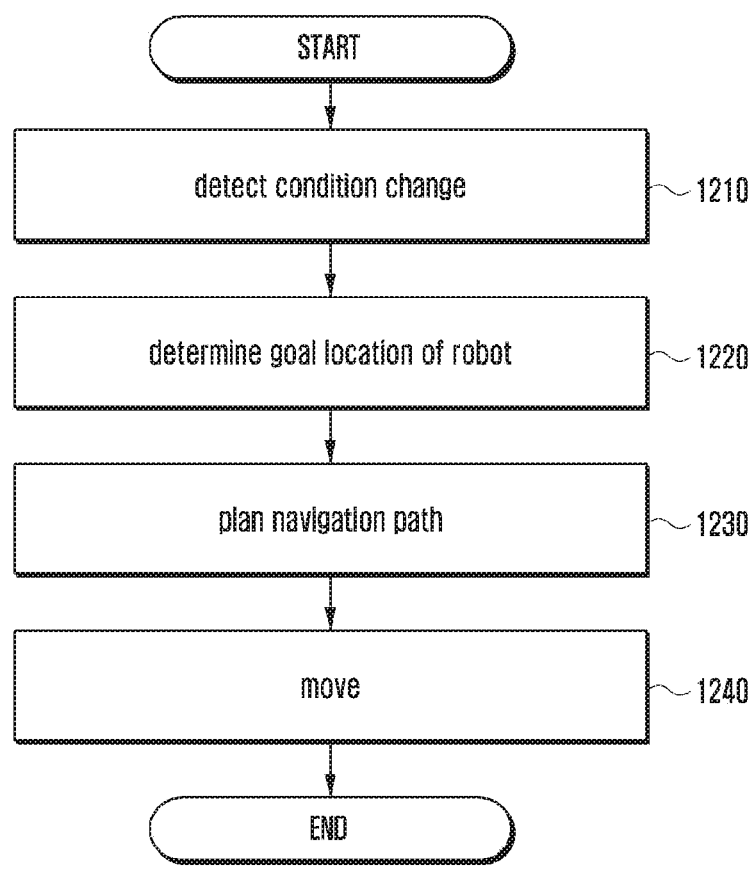
FIG. 12 illustrates a flowchart of a navigation method of an electronic device according to one of various embodiments of the present disclosure; the goal location is updated according to a condition change of the electronic device.

FIG. 12 illustrates a flowchart of a navigation method of an electronic device according to one of various embodiments of the present disclosure; the goal location is updated according to a condition change of the electronic device.

In the embodiment of FIG. 12, the electronic device 101 may detect at least one condition change in a service space of the electronic device 101 at step 1210. The condition change detection operation is described later in detail with reference to FIG. 13.

According to various embodiments, the electronic device 101 may determine its goal location for providing a service at step 1220. For example, the electronic device 101 may update its goal location for providing the service. According to various embodiments, the electronic device 101 may acquire service distance information corresponding to a selected service and determine its goal location based on the service distance information. According to various embodiments, the electronic device 1010 may determine its goal location based on at least one of the service distance information and keep-out zone information.

According to various embodiments, the electronic device 101 may determine, at step 1230, a path towards the goal location determined at step 1220. For example, the electronic device 101 may determine a path from its current location to its goal location. According to various embodiments, the electronic device 101 may determine a navigation path of a robot based on at least one of the service distance information and keep-out zone information According to various embodiments, the electronic device 101 may navigate, at step 1240, along the path determined at step 1230. According to various embodiments, the goal location of the electronic device 101 may be updated continuously while the robot is moving. For example, the electronic device 101 may update its goal location little by little on the move rather than maintaining the initially determined goal location.

FIG. 13 illustrates a diagram of a configuration of navigation information updated upon detection of a condition change according to one of various embodiments of the present disclosure.

According to various embodiments of the present disclosure, the electronic device 101 may detect at least one condition change in its service space. The electronic device 101 may update its goal location according to the detected condition change. For example, the electronic device 101 may update its goal location based on the condition change of at least one of moving objects (e.g., user, guest, and pet animal) and home appliances (e.g., TV and recliner sofa). For example, the electronic device 101 may discern a situation where the user is watching TV 1310, the user is talking with others, the audio is turned on, and the like. For example, the electronic device 101 may detect at least one condition change in its service space based on the signals or sensing information (e.g., change of electromagnetic wave) collected by means of at least one of cameras, microphones, and radio modules. According to various embodiments of the present disclosure, the electronic device 101 may move to its goal location without disturbing the operations of other electronic devices. For example, if the user turns on the TV 1310 in the state that the robot 101 is located between the user and the TV 1310, the electronic device 101 may update its navigation information as shown in FIG. 13 and move to one of the locations corresponding to the cells marked with 1 in the navigation information.

Figure 14:
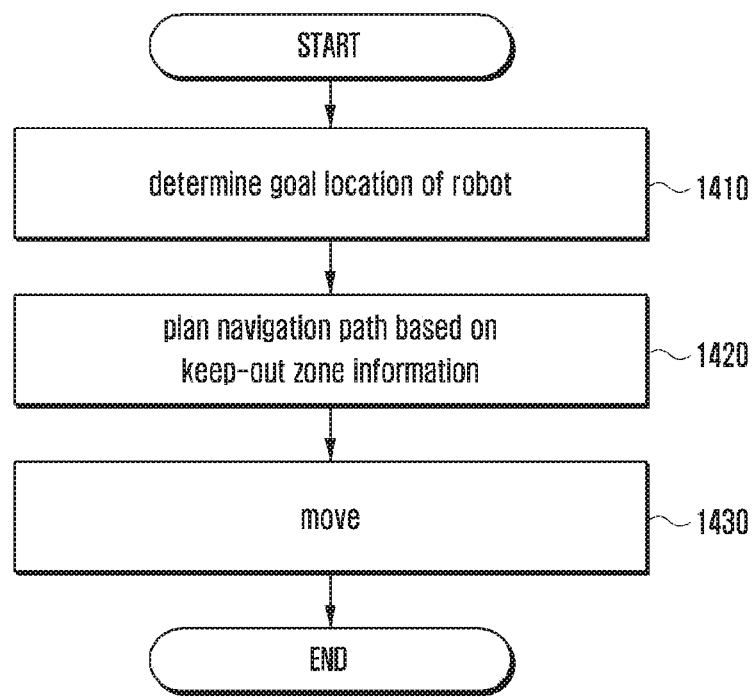
FIG. 14 illustrates a flowchart of a navigation method of an electronic device according to one of various embodiments of the present disclosure; the navigation path is determined based on keep-out zone information.

FIG. 14 illustrates a flowchart of a navigation method of an electronic device according to one of various embodiments of the present disclosure; the navigation path is determined based on keep-out zone information.

In the embodiment of FIG. 14, the electronic device 101 may determine its goal location at step 1410. For example, the electronic device 101 may update its goal location to execute its service. According to various embodiments, the electronic device 101 may acquire service distance information corresponding to a selected service and determine its goal location based on the service distance information. According to various embodiments, the electronic device 101 may determine its goal location based on at least one of the service distance information and keep-out zone information.

According to various embodiments, the electronic device 101 may determine, at step 1420, a path towards its goal location determined at step 1410 by referencing the keep-out zone information. For example, the electronic device 101 may determine the navigation path from its current location to its goal location by referencing the keep-out zone information. According to various embodiments, the electronic device 101 detours to avoid the keep-out zone and to avoid disturbing the user.

According to various embodiments, the electronic device 101 may move, at step 1430, along the path determined at step 1420. According to various embodiments, the goal location of the electronic device 101 may be updated continuously. For example, the electronic device 101 may update its goal location little by little on the move rather than maintaining the initially determined goal location.

Figure 15:
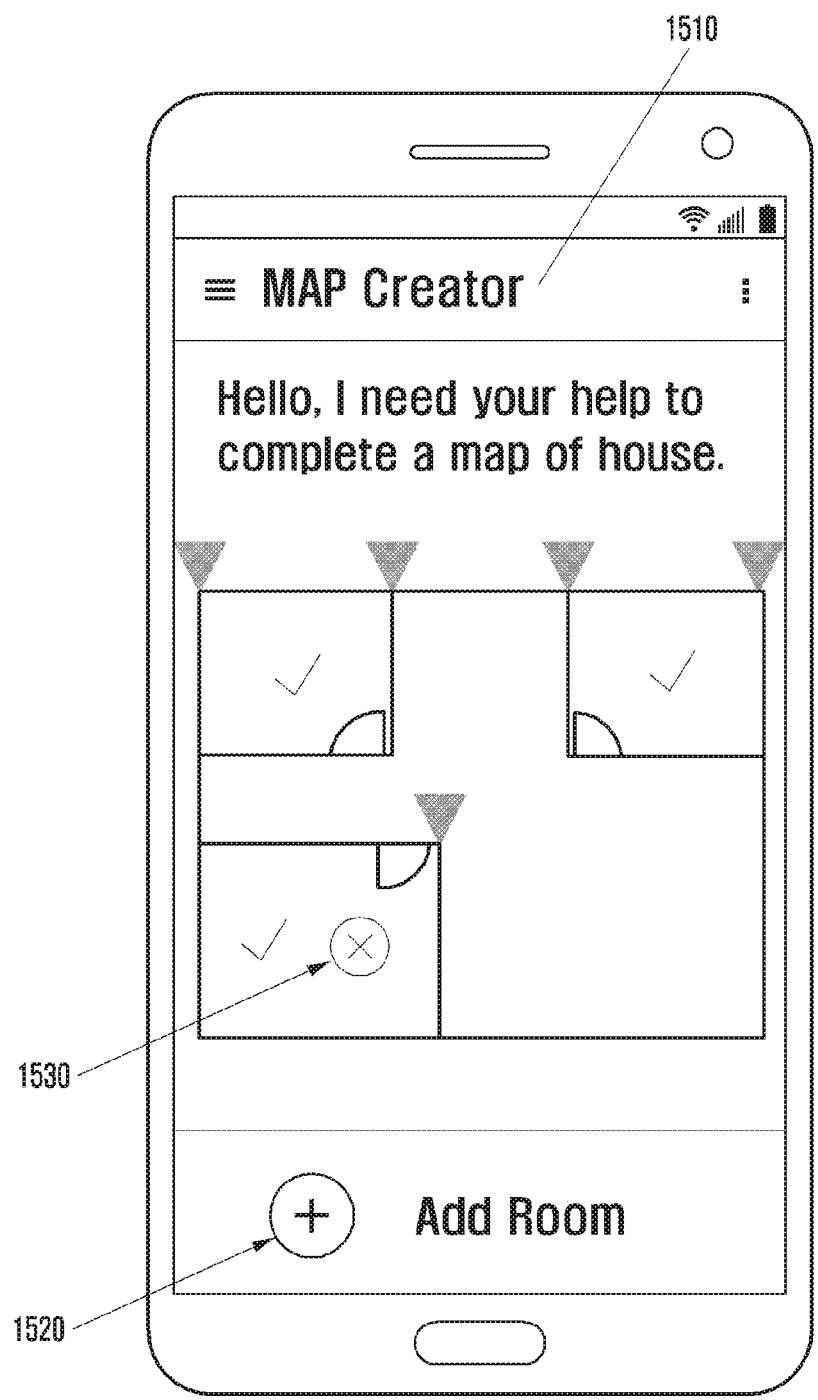
FIG. 15 illustrates a diagram of an exemplary screen display for explaining a method for building a map of a service space of an electronic device according to one of various embodiments of the present disclosure.

FIG. 15 illustrates a diagram of an exemplary screen display for explaining a method for building a map of a service space of an electronic device according to one of various embodiments of the present disclosure.

According to various embodiments, the electronic device 101 (e.g., location module 531) may acquire information on the structural characteristics of the service space of the electronic device 101 from user input. For example, the electronic device 101 may receive a drawing or sketch of its service space from user input. For example, the location module 531 or an electronic device desktop PC, wearable device, and tablet PC) that is functionally connected to the location module 531 may provide the user with a user interface 1510 for entering information on the structural characteristics of the corresponding space. The electronic device 101 may receive the information entered by the user through the user interface 1510.

According to various embodiments, the electronic device 101 may configure the user interface 1510 based on the information acquired by the location module 531. For example, the electronic device 101 may provide the user with layout templates and receive user inputs for modifying one of the templates and generating a target layout. For example, the electronic device 101 may receive a user input for placing a structure in the selected template as denoted by reference number 1520 or deleting a structure from the selected template as denoted by reference number 1530.

Figure 16:
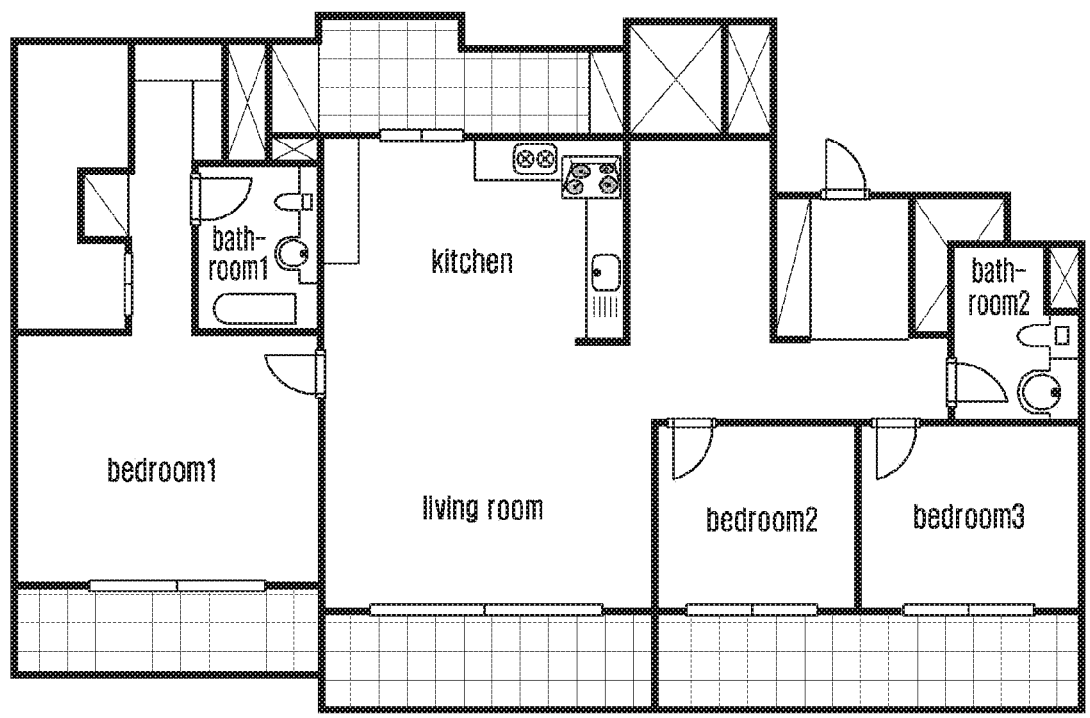
FIG. 16 illustrates a diagram of a floor plan layout for explaining how an electronic device receives the information on its service space according to one of various embodiments of the present disclosure.

FIG. 16 illustrates a diagram of a floor plan layout for explaining how an electronic device receives the information on its service space according to one of various embodiments of the present disclosure.

According to various embodiments, the electronic device 101 (e.g., location module 531) may have information on the structure of its service area. In the embodiment of FIG. 16, the electronic device 101 may store the information on the structural characteristics (e.g., numbers and sizes of walls, rooms, and doors) in the form of a map. For example, the electronic device 101 may acquire data associated with the above information from a web server. Also, the electronic device 101 may acquire the information on the structural characteristics by means of cameras (e.g., stereo cameras, depth cameras, infrared cameras, and IP cameras) that are functionally connected to the electronic device 101. According to various embodiments, the electronic device 101 may acquire the information on the structural characteristics of its service space by means of cameras and sensors (e.g., geomagnetic sensor, gyro sensor, infrared sensor, UWB sensor, and laser sensor).

Figure 17:
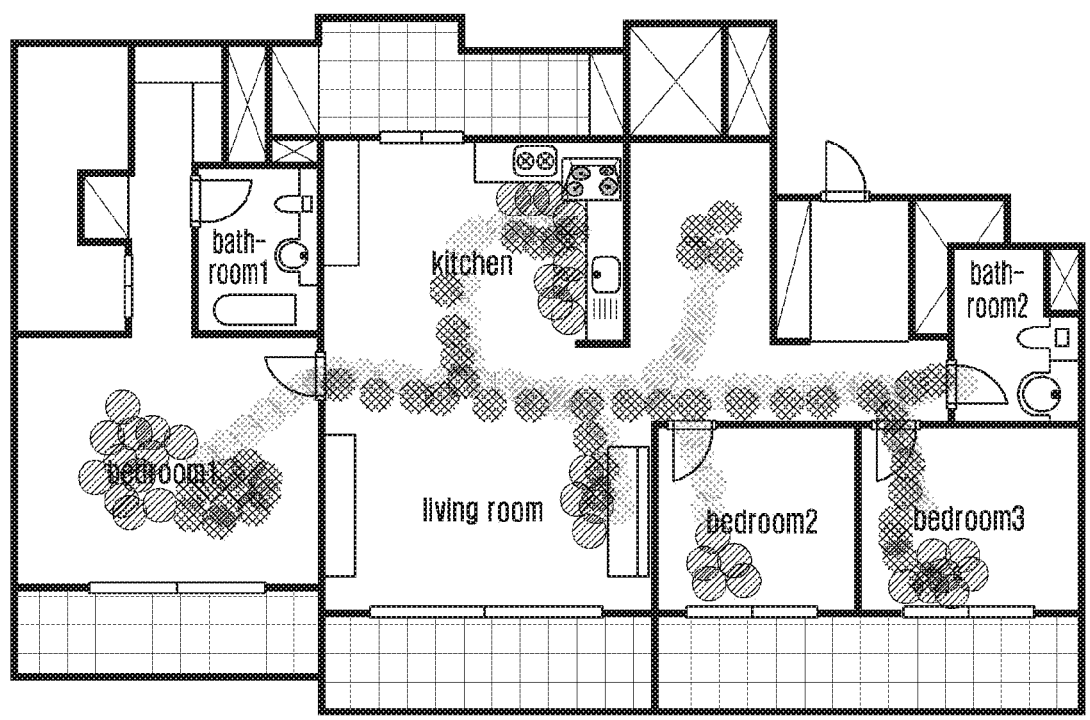
FIG. 17 illustrates a diagram of a floor plan showing moving lines of warm-blooded objects in a service space of an electronic device according to one of various embodiments of the present disclosure.

FIG. 17 illustrates a diagram of a floor plan showing moving lines of warm-blooded objects in a service space of an electronic device according to one of various embodiments of the present disclosure.

According to various embodiments, the electronic device 101 (e.g., location module 531) may acquire heat distribution information (e.g., heat map) based on moving lines, moving patterns, and sojourn times of warm-blooded objects (e.g., users, guests, and pets) in its service space.

According to various embodiments, the electronic device 101 may acquire the above information by means of cameras that are functionally connected to the electronic device 101. For example, the electronic device 101 may collect the location information of an object by analyzing an image taken by a camera and heat distribution information based on sojourn frequency of an object at a location. Alternatively, the electronic device 101 may acquire the heat distribution information based on at least part of the information collected by the sensors that are functionally connected to the electronic device 101. Alternatively, the electronic device 101 may acquire the heat distribution information associated with objects (e.g., first user, second user, first pet, and second robot) in its service space. According to various embodiments, the electronic device 101 may acquire the information on moving path, sojourning-place, and sojourning time per object based on the heat distribution information.

According to various embodiments, the electronic device 101 may acquire information on the locations inappropriate for the electronic device 101 to be located in its service space and generate keep-out zone information based thereon, For example, the electronic device 101 may designate a place with much object activities (e.g., location emphasized or with high heat density in the heat distribution information) as a keep-out zone. For example, the electronic device 101 may notice that the objects are located around the sofa of the living room based on the heat distribution information. In this case, the electronic device 101 may designate the location around the sofa as a keep-out zone. The electronic device 101 may designate a keep-out zone based on a previous record and the current user's location information.

According to various embodiments, the electronic device 101 may designate a location that the user indicates explicitly as a keep-out zone. For example, the electronic device 101 may receive a user input for designating a keep-out zone at a certain location. In this case, the electronic device may designate the corresponding location as a keep-out zone. For example, if the electronic device 101 receives a voice saying "step aside," "not there," and "get out of my sight," or detects that it is being moved forcibly, it may designate the corresponding location as a keep-out zone. Also, the electronic device 101 may receive a user input for designating a keep-out zone through a user interface (e.g., display) that is functionally connected to the electronic device 101.

According to various embodiments, the terms map, location, zone, and space are intended to include probabilistic distribution information. For example, the keep-out zone information may include a probability value in the range of between 0 and 1. In detail, the keep-out zone may be indicated by one of two probability values of true and false or by a probability value in the range between 0 or 1. In the former case, if the user says "step aside," this is interpreted as true; thus, afterward the corresponding location is designated as a keep-out zone. In the latter case, if the user says "step aside," a value selected in the range between 0 and 1 after being weighted with a predetermined weight is input such that the electronic device 101 may determine whether the location is an appropriate location to stay based on this input value during an assessment on the corresponding location. According to various embodiments, the map information may be configured with 2-dimensional or 3-dimensional coordinates. Also, the map information be configured with circular or spherical coordinates centered on the electronic device 101.

According to various embodiments, the electronic device 101 may acquire preferred standby location information. For example, the electronic device 101 may acquire the preferred standby location information from explicit user input. According to various embodiments, the electronic device 101 may acquire the information on the electric appliances and furniture arranged in its service space. For example, electronic device 101 may acquire the information on the locations of the electronic devices and furniture from explicit user input. According to various embodiments, the electronic device 101 may acquire the information on the locations of the electronic appliances and furniture from another electronic device.

According to various embodiments of the present disclosure, an electronic device may include a communication module, a camera module, a sensor module, a driving module, a memory, and a processor that is functionally connected to the communication module, the camera module, the sensor module, the driving module, and the memory, the processor determining at least one service and a goal location of the electronic device for providing the at least one service, planning a path towards the goal location, and controlling the electronic device to move along the path.

The processor may detect condition change of at least one object in a space covered by the electronic device, determine the goal location according to the condition change, and update the path.

The at least one service may include at least one of a voice command service, a photo shoot service, a health care service, a concierge service, and a housemaid service.

The processor may determine the goal location based on service distance information configured for the determined service.

The processor may determine the goal location based on keep-out zone information including information on locations inappropriate for the electronic device to execute the service.

The processor may determine the goal location based on the service distance information and keep-out zone information including information on locations inappropriate for the electronic device to execute the service.

The processor may check a first point per location in the space based on the service distance information and a second point per location in the space based on the keep-out zone information, sum values of the first and second points for a summed value, and determine a location where the summed value is equal to or less than a predetermined value as the goal location.

The processor may check a first point per location in the space based on the service distance information and a second point per location in the space based on the keep-out zone information, sum values of the first and second points for a summed value, and exclude a location where the summed value is equal to or greater than a predetermined value from the path.

The condition change may include at least one of change of condition of a user of the electronic device and change of condition of an object n the space, and at least one of the service distance information and keep-out zone information may be updated according to the condition change.

The processor may acquire the keep-out zone information from a user input, receive it from an external server, or acquire it from heat distribution information collected by at least one of a communication module, a camera module, and a sensor module.

According to various embodiments, a navigation method of an electronic device may include determining at least one service, determining a goal location of the electronic device for providing the at least one service, planning a path towards the goal location, and moving along the path.

Determining the goal location may include detecting condition change of at least one object in a space covered by the electronic device, determining the goal location according to the condition change, and updating the path.

The at least one service may include at east one of a voice command service, a photo shoot service, a health care service, a concierge service, and a housemaid service.

The goal location may be determined based on service distance information configured for the determined service.

The goal location may be determined based on keep-out zone information including information on locations inappropriate for the electronic device to execute the service.

The goal location may be determined based on the service distance information and keep-out zone information including information on locations inappropriate for the electronic device to execute the service.

Determining the goal location may include checking a first point per location in the space based on the service distance information, checking a second point per location in the space based on the keep-out zone information, summing values of the first and second points for a summed value, and determining a location where the summed value is equal to or less than a predetermined value as the goal location.

Determining the goal location may include checking a first point per location in the space based on the service distance information, checking a second point per location in the space based on the keep-out zone information, summing values of the first and second points for a summed value, and excluding a location where the summed value is equal to or greater than a predetermined value from the path.

The condition change may include at least one of change of condition of a user of the electronic device and change of condition of an object in the space, and at least one of the service distance information and keep-out zone information is updated according to the condition change.

Determining the goal location based on the keep-out zone information may include at least one of acquiring the keep-out zone information from a user input, receiving the keep-out zone information from an external server, and acquiring the keep-out zone information from heat distribution information collected by at least one of a communication module, a camera module, and a sensor module.

As described above, the present disclosure is advantageous in terms of placing a mobile electronic device (e.g., robot) at an appropriate position in a given environment.

Also, the present disclosure is advantageous in terms of enabling a robot to determine its own position autonomously based on at least one of the characteristics of its service and environment and to plan a best path to a goal location.

Also, the present disclosure is advantageous in terms of improving user convenience.

The term "module" used in the present disclosure may refer to a unit including one or more combinations of hardware, software, and firmware. The "module" may be interchangeable with a term, such as "unit," "logic," "logical block," "component," or "circuit", The "module" may be a minimum unit of a component formed as one body or a part thereof, may be a minimum unit for performing one or more functions or a part thereof, and may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc read only memory (CD-ROM) disks and digital versatile disc (DVD), magneto-optical media, such as floptical disks, and hardware devices that are specially configured to store and perform program instructions, such as ROM, RAM, and flash memory. Examples of program instructions include machine code instructions created by assembly languages, such as a compiler, and code instructions created by a high-level programming language executable in computers using an interpreter. The described hardware devices may be configured to act as one or more software modules in order to perform the operations and methods described above, or vice versa.

Modules or programming modules according to the embodiments of the present disclosure may include one or more components, remove part of the components described above, or include new components. The operations performed by modules, programming modules, or the other components, according to the present disclosure, may be executed in serial, parallel, repetitive or heuristic fashion. Part of the operations can be executed in any other order, omitted, or executed with additional operations.

Although embodiments of the disclosure have been described in detail above, it should be understood that many variations and modifications of the basic inventive concept herein described, which may be apparent to those skilled in the art, will still fall within the spirit and scope of the embodiments of the disclosure as defined in the appended claims. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
    a communication interface;
    a camera;
    a sensor;
    a driving controller;
    a memory; and
    a processor that is functionally connected to the communication interface, the camera, the sensor, the driving controller, and the memory, the processor being configured to:
    receive a voice command from a user;
    identify, based on the voice command, at least one service;
    obtain service distance information corresponding to the identified service, the service distance information including a grid map indicating distances from a location of the user, each cell of the grid map comprising a number indicating a level of preference according to a position of the electronic device for serving the identified at least one service to the user;
    identify, based on the obtained service distance information, a goal location and a path towards the goal location; and
    control, based on the path towards the goal location, the electronic device to move to the goal location,
    wherein a plurality of service distance information is stored and each service distance information corresponds to one of the plurality of services.

2. The electronic device of claim 1, wherein the processor is further configured to:
    detect a condition change of at least one object in an area space covered by the grid map,
    determine the goal location according to the condition change, and
    update the path.

3. The electronic device of claim 2, wherein the condition change includes at least one of a change of condition of the user of the electronic device and a change of condition of an object in the area space, and at least one of service distance information and keep-out zone information is updated according to the condition change.

4. The electronic device of claim 1, wherein the at least one service includes at least one of a voice command service, a photo shoot service, a health care service, a concierge service, and a housemaid service.

5. The electronic device of claim 1, wherein the processor is further configured to:
    determine the goal location based on the service distance information and keep-out zone information including information on locations inappropriate for the electronic device to execute the service.

6. The electronic device of claim 5, wherein the processor is further configured to:
    identify a first number of the service distance information corresponding to a first cell of the grid map;
    identify a first number of the keep-out zone information corresponding to the first cell of the grid map;
    sum a value of the first number of the service distance information and the first number of the keep-out zone information corresponding to the first cell of the grid map; and
    identify a cell where a summed value is equal to or less than a predetermined value as the goal location.

7. The electronic device of claim 5, wherein the processor is further configured to:
    identify a first number of the service distance information corresponding to a first cell of the grid map;
    identify a first number of the keep-out zone information corresponding to the first cell of the grid map;
    sum a value of the first number of the service distance information and the first number of the keep-out zone information corresponding to the first cell of the grid map; and
    exclude a cell where a summed value is equal to or greater than a predetermined value from the path.

8. The electronic device of claim 1, wherein the processor is further configured to:
    identify the goal location based on keep-out zone information including information on locations inappropriate for the electronic device to execute the service.

9. The electronic device of claim 8, wherein the processor is further configured to:
    acquire the keep-out zone information from a user input,
    receive the keep-out zone information from an external server, or acquire the keep-out zone information from heat distribution information collected by at least one of a communication module, a camera module, and a sensor module.

10. A method of an electronic device, the method comprising:
 receiving a voice command from a user;
 identifying, based on the voice command, at least one service;
 obtaining service distance information corresponding to the identified, the service distance information including a grid map indicating distances from a location of the user, each cell of the grid map comprising a number indicating a level of preference according to a position of the electronic device for serving the identified at least one service to the user;
 identifying, based on the obtained service distance information, a goal location and a path towards the goal location; and
 controlling, based on the path towards the goal location, the electronic device to move to the goal location,
 wherein a plurality of service distance information is stored and each service distance information corresponds to one of the plurality of services.

11. The method of claim 10, wherein identifying the goal location and the path towards the goal location includes:
 detecting a condition change of at least one object in an area space covered by the grid map;
 determining the goal location according to the condition change; and
 updating the path.

12. The method of claim 11, wherein the condition change includes at least one of a change of condition of the user of the electronic device and a change of condition of an object in the area space, and at least one of service distance information and keep-out zone information is updated according to the condition change.

13. The method of claim 10, wherein the at least one service includes at least one of a voice command service, a photo shoot service, a health care service, a concierge service, and a housemaid service.

14. The method of claim 10, wherein the goal location is determined based on the service distance information and keep-out zone information including information on locations inappropriate for the electronic device to execute the service.

15. The method of claim 14, wherein identifying the goal location includes:
 identifying a first number of the service distance information corresponding to a first cell of the grid map;
 identifying a first number of the keep-out zone information corresponding to the first cell of the grid map;
 summing a value of the first number of the service distance information and the first number of the keep-out zone information corresponding to the first cell of the grid map; and
 identifying a cell where a summed value is equal to or less than a predetermined value as the goal location.

16. The method of claim 14, wherein identifying the goal location includes:
 identifying a first number of the service distance information corresponding to a first cell of the grid map;
 identifying a first number of the keep-out zone information corresponding to the first cell of the grid map;
 summing a value of the first number of the service distance information and the first number of the keep-out zone information corresponding to the first cell of the grid map; and
 excluding a cell where a summed value is equal to or greater than a predetermined value from the path.

17. The method of claim 10, wherein the goal location is identified based on keep-out zone information including information on locations inappropriate for the electronic device to execute the service.

18. The method of claim 17, wherein identifying the goal location based on the keep-out zone information includes at least one of:
 acquiring the keep-out zone information from a user input;
 receiving the keep-out zone information from an external server; and
 acquiring the keep-out zone information from heat distribution information collected by at least one of a communication module, a camera module, and a sensor module.

* * * * *